United States Patent [19]

Mizuhara

[11] Patent Number: 4,459,328

[45] Date of Patent: Jul. 10, 1984

[54] ARTICLES COATED WITH WEAR-RESISTANT TITANIUM COMPOUNDS

[75] Inventor: Howard Mizuhara, San Mateo, Calif.

[73] Assignee: GTE Products Corporation, Stamford, Conn.

[21] Appl. No.: 477,057

[22] Filed: Mar. 21, 1983

Related U.S. Application Data

[62] Division of Ser. No. 332,429, Dec. 21, 1981, Pat. No. 4,411,960.

[51] Int. Cl.$^3$ .............................................. B05D 3/02
[52] U.S. Cl. .................................. 427/192; 427/191; 427/190; 427/201; 427/228; 427/226; 427/350; 427/376.6; 427/343; 148/315
[58] Field of Search ............... 428/610, 448, 450, 469, 428/472, 627, 660, 698; 148/31.5; 427/419.7, 190, 191, 192, 201, 228, 226, 350, 376.6, 343, 248.1, 249

[56] References Cited

U.S. PATENT DOCUMENTS

| | | | |
|---|---|---|---|
| Re. 28,485 | 7/1975 | Rix et al. ............................ | 427/228 |
| 3,744,979 | 7/1973 | Kalish ............................... | 427/201 X |
| 3,787,223 | 1/1974 | Reedy ............................... | 148/6.3 X |
| 3,916,052 | 10/1975 | Shattes et al. ..................... | 427/249 |
| 3,999,953 | 12/1976 | Kolaska et al. ................... | 428/926 X |
| 4,101,703 | 7/1978 | Schintlmeister .................... | 428/216 |

Primary Examiner—Shrive P. Beck
Attorney, Agent, or Firm—Donald R. Castle

[57] ABSTRACT

A wear resistant coating on ceramic or metallic substrates is provided by coating the substrate with a titanium based alloy and then converting the titanium to titanium carbide, titanium nitride, titanium carboxynitride or titanium boride.

14 Claims, No Drawings

4,459,328

ARTICLES COATED WITH WEAR-RESISTANT TITANIUM COMPOUNDS

CROSS REFERENCE TO RELATED APPLICATION

This application is a division of Ser. No. 322,429, filed Dec. 21, 1981 and assigned to the assignee of this application, Assignment recorded Dec. 21, 1981, Reel 3969, Frame 0747 and now U.S. Pat. No. 4,411,960.

TECHNICAL FIELD

This relates to articles having a wear resistant coating. More particular it relates to articles having a metallic or ceramic substrate and a coating comprising a hard titanium compound and another metal.

BACKGROUND

Various methods have been used to coat substrates with various titanium compounds. In U.S. Pat. Nos. 3,874,900 and 4,239,536 processes are disclosed for providing a wear resistant surface of titanium carbide and titanium nitride by a chemical vapor deposition process. In the chemical vapor deposition process, titanium tetrachloride is reacted with either ammonia or nitrogen to form titanium nitride. By use of the same chemical vapor deposition process, titanium tetrachloride is reacted with a volatile hydrocarbon such as methane to form a coating of titanium carbide. In the aforementioned patent these are combined to give a composite of titanium carbide and titanium nitride coating.

U.S. Pat. No. 3,868,235 also discloses a process for providing a hard surface. In that process, a metal matrix having a melting point around 2000° F. such as a nickel-chrome-ferrous alloy is applied to a substrate in molten form thereafter a volatile non-metallic organic adhesive is applied to the matrix. Hard metallic carbide such as titanium carbide is deposited on the adhesive layer and the substrate is baked in a furnace below the melting point of the substrate and above the melting point of the matirx alloy whereby the adhesive is volatized, the matrix alloy melts and is bound to the carbide particles and the substrate.

Other processes which can be used to deposit hard compounds of titanium on substrates include sputtering and flame or plasma spraying techniques. Illustrative of these processes are those disclosed in U.S. Pat. Nos. 3,779,720, and 3,895,156.

Chemical vapor deposition processes require use of titanium tetrachloride, a difficult to handle chemical. The process as disclosed in U.S. Pat. No. 3,868,235 requires the use of an organic adhesive which is evolved during processing thus adding a coat to the coated article. Sputtering, plasma, or flame spraying all require special equipment. In addition, plasma or flame spray coating require grinding to get an even coating.

SUMMARY OF THE INVENTION

In accordance with one aspect of this invention there is provided a process for providing a relatively uniform coating containing a refractory titanium compound comprising brazing a preformed alloy consisting essentially of from about 5 to about 25% by weight of nickel, from 0 to about 25% by weight of copper, balance titanium to a ceramic or metallic substrate. Thereafter, the titanium at the outer surface of said alloy is converted to a refractory material selected from the group consisting titanium carbide, titanium nitride, titanium carboxynitride, titanium boride and mixtures thereof.

In accordance with another aspect of this invention, there is provided a process comprising forming a powder mixture consisting essentially of from about 5% to about 30% by weight of nickel, from 0 to 25% by weight of copper, from about 0 to 35% by weight of tungsten carbide and balance titanium hydride. Thereafter a ceramic or metallic substrate is coated with the powder and then heated in a vacuum to a temperature of about 300° C. to about 400° C. for a sufficient time to convert the titanium hydride to titanium metal. The coated substrate is then heated to 1050° C. to form a low melting temperature titanium-nickel copper alloy which will wet ceramic or metal substrate along with tungsten carbide. The titanium metal is then converted to a refractory material selected from the group consisting of titanium nitride, titanium carbide, titanium carboxynitride, titanium boride and mixtures thereof.

In another aspect of this invention there is provided an article consisting essentially of a ceramic or metallic substrate and a coating covering said substrate, said coating having an outer surface consisting essentially of from about 3 to about 27% by weight of nickel, from 0 to about 24% by weight of copper, and the balance selected from titanium carbide, titanium nitride and titanium carboxynitride.

In still another aspect of this invention there is provided an article consisting essentially of a ceramic or metallic substrate, having a coating thereon, by weight of copper, balance titanium. The outer coating surface of said coating consists essentially of from about 0 to about 21.5% copper, from about 4.75% to about 31% by weight of nickel boride and balance titaniumn boride.

For a better understanding of the present invention, together with other and further objects, advantages and capabilities thereof, reference is made to the following disclosure and appended claims in connection with the above description of some of the aspects of the invention.

DETAILED DESCRIPTION OF THE PREFERRED EMBODIMENTS

The present invention uses the method of depositing or converting titanium metal in an alloy form to a hard titanium compound with thickness from 25 to 200 micron thickness, with a tough intermediate metallurgical layer between the substrate and the hard titanium compound. A typical alloy with a flow temperature of 975° C. to 1050° C. is a material sold under the tradename of Ticuni by GTE Wesgo Division of GTE Products Corporation, Belmont, Calif. This material has a composition of about 70% Ti and 15% by weight of Cu and 15% by weight of Ni. An additional material having a composition of about 30% nickel and 70% titanium is useful in the practice of the present invention. The alloys mentioned above can also be used as a powder mix. The above alloy, Ticuni, can be prepared as a composite system with a copper-nickel alloy between inner and outer layers of titanium as shown in U.S. Pat. No. 3,652,237. As is shown in that patent the layers will melt upon brazing to form the appropriate titanium-copper-nickel alloy.

The titanium alloy upon melting on a substrate will develop a gradient of elemental concentration based on substrate chemistry, temperature and time. The treatment of above alloy at from about 900° C. to about 1100° C. with 99.9% pure methane will convert titanium to titanium carbide but the carbide concentration gradient will decrease from the surface down with intermediate form between the substrate and the formed carbide layer close to the substrate the titanium will not be converted to titanium carbide. The intermediate zone will show high toughness and prevent spalling off of hard carbide dispersed layers.

The melted titanium alloy can be cooled to room temperature, coated with carbon or packed in carbon and heated at from about 1000° to about 1100° C. in vacuum of $10^{-4}$ mm Hg for a few hours to produce titanium carbide.

A mixture of $TiH_4$ and Ni powder in a ratio of 70:30% (by weight) can be mixed and spray dried with a small quantity of polyvinyl alcohol binder. By feeding above powder through plasma gun with methane gas and inert gas, the molten alloy will react with the methane gas and form TiC plus nickel. The nickel will act as a binder to hold TiC material. Titanium and nickel will alloy to form ceramic and metal wetting system to form a strong adhering layer.

An additional method of forming a hard titanium compound is by melting 70% Ti-30% Ni alloy onto a steel substrate in a vacuum, remove from vacuum and immerse in a conventional boriding salt bath set at about 850° C. for about 2 hours. The boriding treatment will convert both nickel and titanium to the respective borides, both very hard materials.

The unique property of the Ti-Ni and Ti-Ni-Cu alloy systems is that they will wet both metal and non-metallic surfaces such as alumina, silicon nitride, tungsten carbide, tantalum nitride, tantalum carbide, molybdenum carbide, diamond and the like. This capability to wet nearly all surfaces means that titanium alloy can be used to hold the hard refractory materials listed above onto the substrate material of either ceramic or metallic surfaces, and followed by treatment to form the aforementioned hard compounds.

In order to more fully describe the subject invention, the following detailed examples are presented.

EXAMPLE 1

A porous alumina ceramic grinding wheel face is carefully coated with a slurry mixture of $TiH_4$-49%, Ni-21%, WC-30% and glycerol, dried and heated to about 1050° C. under about $10^{-4}$ mm Hg vacuum. The titanium-nickel alloy will wet both alumina and tungsten carbide and bond tungsten carbide to the surface of alumina wheel. The titanium portion is converted to titanium carbide, titanium nitride or titanium carboxynitride by the vapor reaction method heretofore described or to titanium boride by the boride bath procedure.

EXAMPLE 2

A paste is prepared using a mixture of 70% titanium hydride and 30% nickel powder mixed with glycerol. The paste is applied to an alumina substrate and melted at about 1000° C. to about 1100° C. in $10^{-4}$ mm Hg vacuum and then cooled. The melted alloy yields a coating of about 1-5 mil thickness. The coating alloy, the substrate, is treated in the manenr previously to form the aforementioned hard titanium compound selected from titanium nitride, titanium carbide, titanium carboxynitride or titanium boride.

EXAMPLE 3

The following powder mix is prepared:
49%—$Ti H_4$
21%—Ni
30%—WC

The powder is mixed with glycerol to form a paste and applied to form a coating on the wear area of ceramic or metal component. It is thereafter heated to about 1000° C. to about 1100° C. in $10^{-4}$ mm Hg vacuum or in very dry ($-100°$ C. dew point) inert gas to melt and flow the alloy. The finished product is coated with an abrasion resisting coating and can be made even harder by converting the titanium to a hard titanium compound such as titanium nitride, titanium carbide and the like.

EXAMPLE 4

A mixture of about 10% copper, about 63% $TiH_4$ and about 27% nickel, all in a form of a powder, is made into a paste and applied on a steel substrate. The assembly of the substrate and paste is placed in a vacuum furnace, which is evacuated to about $10^{-4}$ to $10^{-5}$ mm Hg and heated to about 1050° C. After about 5 minutes the material is nitriding at 900° to 1000° C. using anhydrous ammonia. The titanium is converted to titanium nitride.

EXAMPLE 5

A 5 mil thickness layer of a composite consisting of Ti 35%-CuNi 30%-Ti 35% is placed on a surface of steel substrate. The assembly of the substrate and composite is placed in a vacuum furnace. The furnace is evacuated to about $10^{-5}$ mm Hg and then heated to 1000° C. to 1050° C. to melt the composite on the steel. The furnace is cooled to about 900° C.–950° C. and methane gas is introduced to form titanium carbide.

EXAMPLE 6

A 20 mil thick layer of a composite consisting of Ti 35%-Ni 30%-Ti 35% is placed on a steel substrate and melted in a $10^{-5}$ mm Hg vacuum by heating to about 1050° C. The coated substrate is cooled to between 900° C. to 950° C. and the furnace is back filled with anhydrous ammonia gas to about 300 mm Hg to form TiN on the surface of the coated assembly.

While there has been shown and described what are at present considered the preferred embodiments of the invention, it will be obvious to those skilled in the art that various changes and modifications may be made therein without departing from the scope of the invention as defined by the appended claims.

What is claimed is:
1. A process comprising
(a) coating the substrate selected from ceramic and metal substrates with an alloy consisting essentially of from about 0 to about 25% by weight of copper, from about 5 to about 30% by weight of nickel, balance titanium, and
(b) converting at least a major portion of the titanium in said alloy to a refractory material selected from the group consisting of titanium carbide, titanium nitride, titanium carboxynitride, titanium boride and mixtures thereof.
2. A process according to claim 1 wherein said coating is provided by placing a metal powder containing said copper, nickel and titanium adjacent to said sub- strate and heating for a sufficient time to melt said metals to form said alloy.

3. A process according to claim 1 wherein said coating is provided by placing a trilaminate, containing titanium as a first and third layer and of nickel or nickel-copper as a second layer between said first and third layer, adjacent to said substrate and heating for a sufficient time to melt said trilaminate.

4. A process according to claim 1 wherein said conversion step comprises heating said article to a temperature of from about 900° C. to about 1100° C. in an atmosphere of ammonia gas or nitrogen gas.

5. A process according to claim 1 wherein said conversion step comprises coating said alloy with at least a stoichiometric amount of carbon, heating said coated area of said substrate to a temperature of from about 900° C. to about 1100° C. in a vacuum or inert atmosphere for a sufficient time to convert essentially all of said titanium to titanium carbide.

6. A process according to claim 1 wherein said conversion step comprises heating said article to a temperature of form about 900° C. to about 1100° C. in atmosphere of a gaseous alkane.

7. A process according to claim 1 wherein said conversion step comprises heating said article to a temperature of from about 900° C. to about 1100° C. in a gaseous atmosphere containing nitrogen and carbon in a ratio of C:N of about 1.

8. A process according to claim 1 wherein said conversion step comprises
   (a) immersing said article in a boriding salt bath having a temperature of from about 800° C. to about 950° C. and
   (b) keeping said article immersed for a sufficient time to convert essentially all of said titanium to titanium boride.

9. A process comprising
   (a) forming a mixture containing from about 5 to about 30% by weight of nickel powder, from about 0 to about 25% by weight of copper powder, from about 0 to about 35% by weight of tungsten carbide and balance titanium hydride,
   (b) placing said powder on a portion of a substrate selected form metallic and ceramic substrates,
   (c) heating said powder to a temperature of from about 300° C. to about 400° C. for a vacuum for a sufficient time to convert said titanium hydride to titanium metal, and
   (d) converting said titanium to a refractory material selected from the group consisting of titanium nitride, titanium carbide, titanium carboxynitride and titanium boride.

10. A process according to claim 9 wherein said conversion step comprises heating said article to a temperature of from about 900° C. to about 1100° C. in an atmosphere of ammonia gas or nitrogen gas.

11. A process according to claim 9 wherein said conversion step comprises coating said alloy with at least a stoichiometric amount of carbon, heating said coated area of said substrate to a temperature of from about 900° C. to about 1100° C. in a vacuum or inert atmosphere for a sufficient time to convert essentially all of said titanium to titanium carbide.

12. A process according to claim 9 wherein said conversion step comprises heating said article to a temperature of from about 900° C. to about 1100° C. in atmosphere of a gaseous alkane.

13. A process according to claim 9 wherein said conversion step comprises heating said article to a temperature of from about 900° C. to about 1100° C. in a gaseous atmosphere containing nitrogen and carbon in a ratio of C:N of about 1.

14. A process according to claim 9 wherein said conversion step comprises
   (a) immersing said article in a boriding salt bath having a temperature of from about 800° C. to about 950° C. and
   (b) keeping said article immersed for a sufficient time to convert essentially all of said titanium to titanium boride.

* * * * *